Jan. 22, 1963 M. TERHO 3,074,575
DEVICE FOR LOADING AND UNLOADING A TRUCK USING
A DETACHABLE PLATFORM
Filed June 17, 1959 2 Sheets-Sheet 1

INVENTOR
MIKKO TERHO
By Herman L. Gordon
ATTORNEY

United States Patent Office 3,074,575
Patented Jan. 22, 1963

3,074,575
DEVICE FOR LOADING AND UNLOADING A TRUCK USING A DETACHABLE PLATFORM
Mikko Terho, Helsinki, Finland
(Naantali, Finland)
Filed June 17, 1959, Ser. No. 820,894
5 Claims. (Cl. 214—515)

The invention to be presented here concerns a device for loading and unloading a truck using a platform which is easily detached from the chassis of the truck and again attached to it, the front end of this platform being provided with a support which automatically swings under the platform on backing the truck under the platform and automatically swings to supporting position when the truck is driven away from under the platform.

The invention is characterized in that the rear end of the truck platform is provided with a locking device for fixing the rear end of the platform to a stationary bridge, so that the platform on driving the truck away from under the platform stays in its place, and that the platform and the chassis is provided with an automatical locking device for locking the platform to the chassis of truck for driving position, when the truck is backing up under the platform.

Figure 1:
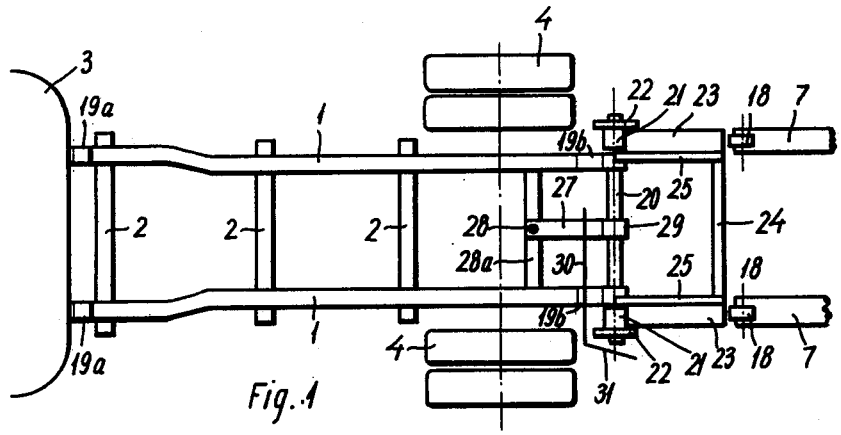
Figure 2:
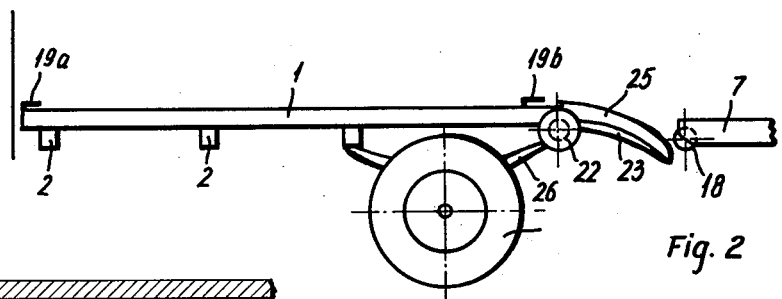
Figure 8A:
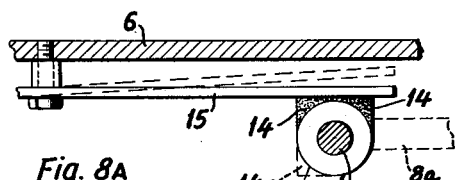
Figure 4:
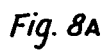
Figure 3:
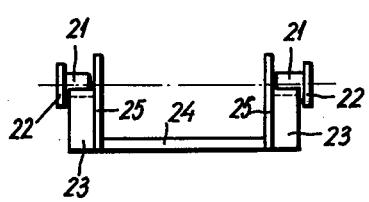
Figure 5:
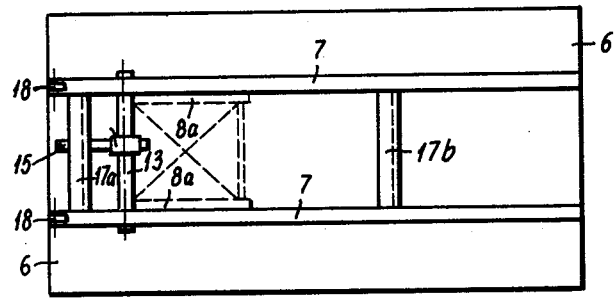
Figure 6:
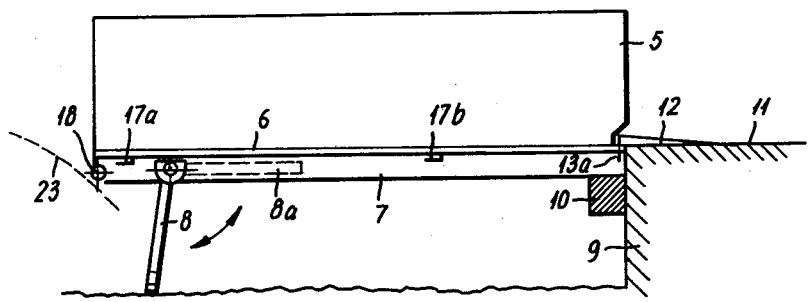
Figures 7, 8:
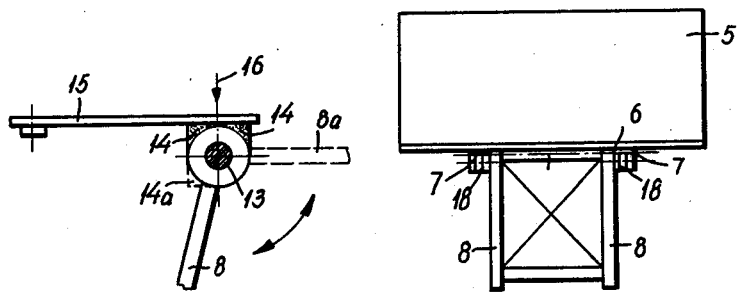

The accompanying drawings illustrate one mode of operation of the invention and present the following:

FIG. 1 shows the chassis of a truck, according to the invention, seen from above, however, excluding all parts of lesser importance to the invention, FIG. 2 shows the same as above, but seen from the side, FIG. 3 shows the same as above, but seen from the rear, FIG. 4 shows a detail relating to FIG. 2 on enlarged scale, FIG. 5 shows a patform of a truck seen from underneath, FIG. 6 shows the platform of a truck detached from the truck and attached to a bridge, or similar, seen from the side, FIG. 7 shows the same as above, but seen from the rear, FIG. 8 shows a detail relating to FIG. 6, projected in part on enlarged scale.

FIGURE 8A is an enlarged fragmentary longitudinal vertical cross-sectional view showing the manner of mounting of the platform support member of FIGURE 6 and the spring retaining means therefor.

In the drawing designation 1 means the side members of the chassis, and 2 the transverse members, 3 the truck cabin, 4 the wheels, the other parts of the truck of lesser importance to the invention being left undrawn and unmarked. The cargo platform detached from the truck is presented in FIGURES 6 and 7 in which designation 5 means the side- and rear walls, 6 the bottom of the platform, 7 the bars supporting the platform, and 8 the foot supporting the rear end of the platform. The front end of the platform rests on bar 10, which is fixed to the vertical side wall 9 of the bridge. A bolt 13a, or the like, is fixed to the horizontal top surface 11 of the bridge by way of chain 12, by means of which bolt the rear end of the truck platform can be fixed to its place, so that it will not be in a position to slip off bar 10.

Support 8 is able to swing around shaft 13, and can thus be brought to position 8a presented by broken lines. FIG 8 presents details related to shaft 13 on enlarged scale. The shaft is furnished with welded tips 14 defining cam means, and is pressed by spring 15 in the direction of arrow 16, so that it keeps well in the position marked by designation 8. Nevertheless, it is possible to lift support 8 to position 8a, due to the resiliency of spring 15.

The power of spring 15 is such that the support without the influence of any obstacles will drop of itself to position 8, and stay there. The spring 15 exerts a yieldable locking action, bearing on both of the welded cam tips 14, 14 in the full-line position of the support 8 in FIGURE 8, tending to retain the support in its depending position. The spring 15 is also effective to engage the side of the right-hand cam tip 14 of FIGURE 8 to yieldably retain the support in its dotted view retracted position, shown at 8a in FIGURE 8.

Transverse irons 17a and 17b, L-shaped in cross-section, join to bottom bars 7 of the truck platform. Rollers 18 join to the front end of bars 7.

Hook-like members 19a and 19b join to the frame bars of the truck. Shaft 20 joins to the rear end of the bars, and rollers 21, furnished with flanges 22, join to the shaft. Bevel rails 23 lead to the upper part of rollers 21, the rear ends of which rails are joined by connecting member 24. Vertical flanges 25 join to the inner edges of the rails.

When the truck platform is in the position seen in FIG. 6, the truck backs up towards it in such a way, that rail 23 takes the position indicated by broken lines in FIG. 6. Then, rollers 18 in FIG. 1 joining to bars 7 of the truck platform meet rails 23, and start gliding along these, while rails 23 due to the resiliency of springs 26 of the truck at first sink downwards. Flanges 25 guide rollers 18 and bars 7, so that rollers 18 come on top of rollers 21 and rool over these, at which rollers 21 come under beams 7. As the truck is backed further up, flanges 22 guide rollers 21 so, that the latter are pushing along the lower surface of bars 7 towards their rear end. Connecting member 24 then pushes support 8 in front of its towards position 8a. Support 8 has already previous to this risen from the ground, when bars 7 have entered on top of rollers 21. After the front ends of bars 7 have passed over rollers 21 these are pushed gliding parallel to bars 1 towards cabin 3, the rollers continuing to support bars 7. Eventually the bottom 6 of the cargo platform is supported by the bars 1 of the truck because the space between the rail bars 1 of the truck chassis is smaller than the space between the bottom bars 7 of the load platform. L-shaped irons 17b then come underneath hooks 19b in the manner presented in FIG. 4, which figure represents a cross-sectional view of these members lengthwise of the truck. In a corresponding manner front L-iron 17a comes underneath hooks 19a.

The front end of spring 27 is firmly joined to bar 28a at the rear end of the chassis of the truck, e.g. by means of bolt 28. At the rear end of the spring a wedgelike hook 29 is located having the shape indicated in FIG. 4. Due to action of spring 27 the wedgelike hook 29 on backing the truck pushes along the lower surface of L-shaped iron 17b to position 29a, thus locking to its place L-shaped iron 17b so that this cannot move backwards, at which at the same time the entire platform of the truck has become locked to its place, when the rear hooks 19b, and L-shaped iron 17b, are in locked position, the front hooks 19a and front L-iron 17a likewise lock the front end of the platform of the truck, so that this cannot glide from the chassis of the truck in upward direction.

After the platform of the truck thus is locked in position relative to the chassis of the truck, bolt 13a may be lifted up from the corresponding hole in the platform of the truck, and the platform detached from bridge 11, at which the truck, together with the platform locked to it, can start off and transport the load on the platform to the desired destination.

The truck platform can be detached in the opposite order from the chassis and attached to the bridge. When the truck therefore has backed up to such a position, that bars 7 have come on top of beam 10, and bolt 13a has been put in position, the locking of the truck platform relative to the chassis is then released. For this purpose shaft 30 is attached with bearings to the rear end of the chassis as shown in FIGURES 1 and 4. Shaft 30 can be turned by means of its end portion, which is bent to form a crank. Cam 32 is joining to shaft 30 at spring 27, which cam when the truck platform is in locked position extends horizontally, so that spring 27, and correspondingly hook 29 have the position indicated by unbroken lines in FIG. 4. When shaft 30 is turned by means of crank 31, cam 32 is rotated downwards to the position 32a shown by broken lines, and correspondingly, position 29a is taken by the hook at which the locking is released, and the truck is able to drive ahead leaving the rear end of the truck platform supported by beam 10. While the truck is moving away from underneath support 8a, the support drops to position 8 and on advancing further rollers 18 start gliding downwards along rails 23, at which support 8 hits the ground and begins to support the front end of the truck platform, from underneath of which the entire truck chassis is leaving. When the truck has moved ahead and the chassis has left entirely from underneath the platform of the truck, this is then able to drive directly, for instance, under a close by ready load truck platform in the manner described above, and take this along with it. The truck may thus be in continuous use without the need of waiting during loading of the truck platform. There may be several platforms being loaded, so that always one of them is ready for attachment to the truck, thus highly increasing the speed of transportation by trucks.

The invention is naturally by no means limited to the above described mode of performance illustrated in the drawings, but it may be varied freely within the scope of the main principle of the invention and the patent claims.

I claim:

1. In combination, a truck having a chassis comprising a pair of longitudinally extending side members, transversely extending means connecting said side members, downwardly and rearwardly inclined rails on the rear portion of said chassis outwardly adjacent the rear ends of said side members, outwardly flanged rollers on the rear portion of said chassis at the forward ends of and aligned with said rails, the forward ends of said rails being disposed immediately adjacent to and leading to the upper portions of said rollers, a platform member adapted to be removably supported on said chassis, said platform member comprising a cargo-supporting body, a support pivoted to the forward end portion of said platform member subjacent said body, said support being swingable to a depending supporting position, a pair of longitudinal depending bars secured to the bottom of said body and being spaced to be received on said rollers inside the flanges thereof, the distance between said side members being less than the distance between said bars, rollers on the forward ends of said bars engageable on said rails, transversely extending means connecting the rails engageable with said support responsive to the rearward movement of the chassis beneath the platform to swing said support to a position beneath and substantially parallel to said body, and cooperating means on the chassis and the platform member locking the platform member to the chassis responsive to the rearward movement of the chassis beneath the platform member to a position wherein the major portion of the chassis underlies the platform member.

2. The structure of claim 1, and cam means on the support and a leaf spring secured to the platform member and engaging said cam means and being constructed and arranged to retard the swinging motion of the support.

3. The structure of claim 1, and wherein said cooperating means comprises transverse inverted substantially L-shaped rearwardly facing members on said chassis and transverse L-shaped forwardly facing members on the bottom of said body lockingly interengageable with said inverted L-shaped members, and a resilient upwardly facing hook member on the chassis lockingly engageable with one of the L-shaped members on the bottom of the body.

4. The structure of claim 3, wherein said hook member is provided with a downwardly and rearwardly inclined rear top surface cammingly engageable with said last-named one of the L-shaped members so as to be depressed thereby and located to disengage therefrom to allow the hook member to lockingly engage therewith when said major portion of the chassis has been moved to underlying position beneath the platform member, and a release member rotatably mounted on the chassis immediately above said hook member and being formed to at times engage with the hook member to depress same to an unlocking position, whereby to allow the platform member to be detached from said chassis.

5. The structure of claim 2, and wherein said leaf spring comprises a longitudinally extending spring arm secured at one end to the platform member and said cam means is engaged by the other end of the spring arm, said cam means having spaced surfaces engaged by the spring arm when the support is in a predetermined depending position, the spring arm being of sufficient strength to substantially limit said support to said predetermined depending position, the spring arm being sufficiently yieldable to allow the support to drop to said predetermined depending position.

References Cited in the file of this patent

UNITED STATES PATENTS

| | | |
|---|---|---|
| 476,601 | Boeselager | June 7, 1892 |
| 479,533 | Schultz | July 26, 1892 |
| 735,005 | Ware | July 28, 1903 |
| 1,269,265 | Duggan | June 11, 1918 |
| 2,518,293 | De Anguera | Aug. 8, 1950 |
| 2,810,590 | Grant | Oct. 22, 1957 |
| 2,867,339 | Nelson | Jan. 6, 1959 |